(12) United States Patent
Edwards et al.

(10) Patent No.: US 11,238,478 B2
(45) Date of Patent: Feb. 1, 2022

(54) COMMERCIALIZING USER PATTERNS VIA BLOCKCHAIN

(71) Applicant: Toyota Motor North America, Inc., Plano, TX (US)

(72) Inventors: Michael C. Edwards, McKinney, TX (US); David M. Goemer, Frisco, TX (US); Hazem Ahmed, Plano, TX (US)

(73) Assignee: Toyota Motor North America, Inc., Plano, TX (US)

( * ) Notice: Subject to any disclaimer, the term of this patent is extended or adjusted under 35 U.S.C. 154(b) by 189 days.

(21) Appl. No.: 16/258,476

(22) Filed: Jan. 25, 2019

(65) Prior Publication Data
US 2020/0242646 A1    Jul. 30, 2020

(51) Int. Cl.
| | |
|---|---|
| *G06Q 30/00* | (2012.01) |
| *G06Q 30/02* | (2012.01) |
| *H04L 9/06* | (2006.01) |
| *H04L 9/32* | (2006.01) |
| *G07C 5/08* | (2006.01) |

(52) U.S. Cl.
CPC ..... *G06Q 30/0211* (2013.01); *G06Q 30/0265* (2013.01); *G06Q 30/0266* (2013.01); *G06Q 30/0267* (2013.01); *G07C 5/08* (2013.01); *H04L 9/0618* (2013.01); *H04L 9/321* (2013.01); *H04L 2209/38* (2013.01)

(58) Field of Classification Search
CPC ... G06Q 30/0211; H04L 9/0618; H04L 9/321; H04L 2209/38; G07C 5/08; G07C 5/008
See application file for complete search history.

(56) References Cited

U.S. PATENT DOCUMENTS

| | | | | |
|---|---|---|---|---|
| 8,666,436 | B2* | 3/2014 | Ellanti | H04M 3/42348 |
| | | | | 455/457 |
| 9,853,959 | B1* | 12/2017 | Kapczynski | G06F 21/62 |
| 10,022,613 | B2* | 7/2018 | Tran | G06F 3/011 |
| 10,783,600 | B2* | 9/2020 | Zachary | G06Q 30/0265 |
| 2011/0276378 | A1* | 11/2011 | Pointer | G06Q 30/0215 |
| | | | | 705/14.17 |
| 2015/0228192 | A1* | 8/2015 | Kawamoto | G08G 1/202 |
| | | | | 701/537 |
| 2016/0217532 | A1* | 7/2016 | Slavin | G06Q 30/0255 |
| 2017/0046652 | A1 | 2/2017 | Haldenby et al. | |
| 2017/0230791 | A1 | 8/2017 | Jones | |

(Continued)

OTHER PUBLICATIONS

Kshteri, Nir., et al. "Online Advertising Fraud." Cybertrust, Digital Object Identifier, IEEE, Mar. 11, 2019. (Year: 2019).*

(Continued)

*Primary Examiner* — Luis A Brown
(74) *Attorney, Agent, or Firm* — Snell & Wilmer LLP

(57) ABSTRACT

Methods and systems for commercializing vehicle data. The method includes writing, by an electronic control unit (ECU) of a vehicle, to a distributed ledger, vehicle data. The method also includes providing, by a computing device associated with a third party, a communication to the vehicle based on the vehicle data on the distributed ledger. The method also includes writing, by a processor of the computing device associated with the third party, to the distributed ledger, a record of providing the communication to the vehicle. The method also includes receiving, by the ECU of the vehicle, the communication.

8 Claims, 8 Drawing Sheets

(56) References Cited

U.S. PATENT DOCUMENTS

| | | | | |
|---|---|---|---|---|
| 2018/0018723 | A1* | 1/2018 | Nagla | H04L 63/08 |
| 2018/0091596 | A1* | 3/2018 | Alvarez | H04L 67/12 |
| 2018/0329693 | A1* | 11/2018 | Eksten | G06F 16/21 |
| 2018/0342036 | A1* | 11/2018 | Zachary | H04L 9/0637 |
| 2018/0345966 | A1* | 12/2018 | Aso | G01C 21/3407 |
| 2019/0057431 | A1* | 2/2019 | Pareek | G06Q 30/0224 |
| 2019/0130451 | A1* | 5/2019 | Logvinov | G06Q 20/18 |
| 2019/0149598 | A1* | 5/2019 | Sawada | B01D 46/46 |
| | | | | 701/2 |
| 2019/0253431 | A1* | 8/2019 | Atanda | G06F 21/62 |
| 2019/0378152 | A1* | 12/2019 | Zhang | G06Q 20/06 |
| 2019/0385269 | A1* | 12/2019 | Zachary | G07C 5/008 |
| 2020/0007344 | A1* | 1/2020 | Chepak, Jr. | H04L 9/0643 |
| 2020/0118124 | A1* | 4/2020 | Menon | G06Q 20/409 |
| 2020/0126114 | A1* | 4/2020 | Kuo | G06N 20/00 |
| 2020/0175554 | A1* | 6/2020 | Vukich | H04L 9/3239 |
| 2020/0226280 | A1* | 7/2020 | Somani | G06Q 20/387 |
| 2020/0226853 | A1* | 7/2020 | Ahmed | H04W 12/106 |
| 2020/0233940 | A1* | 7/2020 | Edwards | H04L 63/0861 |
| 2020/0233973 | A1* | 7/2020 | Ahmed | G06F 21/6245 |
| 2020/0250665 | A1* | 8/2020 | Wu | G06Q 20/3829 |
| 2020/0295935 | A1* | 9/2020 | Kayan | H04L 9/3255 |

OTHER PUBLICATIONS

Harvey, Campbell, et al. "How Blockchain Will Change Marketing as we Know It." Fuqua School of Business, Duke University, Sep. 2018. (Year: 2018).*
"Cardata—Smart Date in Cars Using Blockchain Technology"; 52 pages; 2018.
"VINchain—Decentralized Vehicle History"; 67 pages; Feb. 23, 2018.
Sheridan; "Digitizing Vehicles: The First Blockchain-Backed Car Passport"; 6 pages; Mar. 24, 2017.
Murray; "BMW Ford and GM Loot to Bring Blockchain to Vehicles"; 10 pages; May 3, 2018.
"MVL Mass Vehicle Ledger"; 39 pages; Apr. 2018.
La'Zooz; "A Value System Designed for Sustainability"; 10 pages; Jul. 24, 2018.
Golia; "Toyota, MIT Spotlight Driver Data in Blockchain Partnership" 3 pages; May 30, 2017.
Freudiger; "Evaluating the privacy Risk of Location-Based Services" In: Danezis G. (eds) Financial Cryptography and Data Security. FC 2011. Lecture Notes in Computer Science, vol. 7035; 16 pages; 2012.

* cited by examiner

COMMERCIALIZING USER PATTERNS VIA BLOCKCHAIN

BACKGROUND

1. Field

This specification relates to a system and a method for commercializing vehicle data.

2. Description of the Related Art

A vehicle may contain any number of sensors configured to detect any number of respective types of data. For example, a vehicle may have an odometer for measuring vehicle distance traveled or a global positioning system (GPS) sensor for determining the location of the vehicle. In a modern, computerized society, data associated with an individual has become important to companies and governments. Accordingly, the monetary value associated with this data has risen. As the importance and value of data continues to increase, so does the importance of protecting privacy rights of the individuals with whom the data is associated.

SUMMARY

What is described is a method for commercializing vehicle data. The method includes writing, by an electronic control unit (ECU) of a vehicle, to a distributed ledger, vehicle data. The method also includes providing, by a computing device associated with a third party, a communication to the vehicle based on the vehicle data on the distributed ledger. The method also includes writing, by a processor of the computing device associated with the third party, to the distributed ledger, a record of providing the communication to the vehicle. The method also includes receiving, by the ECU of the vehicle, the communication.

Also described is a method for commercializing user data associated with transportation. The method includes writing, by a processor of a computing device associated with a user, to a distributed ledger, user data. The method also includes providing, by a computing device associated with a third party to the computing device associated with the user, a communication based on the user data on the distributed ledger. The method also includes writing, by a processor of the computing device associated with the third party, to the distributed ledger, a record of providing the communication to the computing device associated with the user. The method also includes receiving, by the computing device associated with the user, the communication.

Also described is a system for commercializing vehicle data. The system includes an electronic control unit (ECU) of a vehicle configured to detect vehicle data using one or more sensors and write vehicle data to a distributed ledger. The system also includes a computing device associated with a third party, the computing device configured to provide, to the vehicle, a communication based on the vehicle data on the distributed ledger and write a record of providing the communication to the vehicle to the distributed ledger.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, vehicles, and methods for commercializing vehicle data using blockchain technology. Vehicle data, which may include any information pertaining to the vehicle, such as location data, fuel consumption data, entertainment data corresponding to entertainment (e.g., music, news, sports, etc.) consumed by occupants within the vehicle, or driving routine data. This vehicle data may be used to provide targeted advertisements to the occupants and/or the driver of the vehicle.

Existing systems which may be used to collect vehicle data have a centralized structure where the collected vehicle data is stored and maintained by a single entity. This single entity may be the vehicle manufacturer or a data management company. In some embodiments, the data management company may be able to access vehicle data via a mobile device within the vehicle that is communicatively coupled to the vehicle computing devices and has access to the vehicle data.

In these existing systems, a third-party company (e.g., an advertising company) that desires access to the vehicle data may not be able to verify the accuracy of the vehicle data if the third-party company is receiving the vehicle data from the manufacturer or the data management company. Further, the user of the vehicle may not be assured that the vehicle data has been properly anonymized prior to its release to the third-party company. Thus, there is a need for systems and methods for collecting and sharing vehicle data.

The systems and methods described herein disclose a decentralized architecture for collecting and sharing vehicle data and regulating access to the vehicle data. The vehicle data is maintained on a distributed ledger, which is immutable and trusted. Furthermore, the vehicle data may be anonymized so that the user and/or vehicle associated with the vehicle data may not be identified. The distributed ledger may be accessible by the third-party company, and the third-party company may use the vehicle data from the distributed ledger to communicate advertisements to the user. In this way, the systems and methods described herein provide a better anonymized and more trustworthy way to collect and use vehicle data. In some embodiments, access to the distributed ledger may be sold to third parties by the vehicle manufacturer. The systems and methods described herein are able to facilitate interactions between the vehicle and third parties in real time. These interactions can drive business to the third parties while the vehicle manufacturer may monetize the information without compromising the privacy of the vehicle users.

Figure 1:
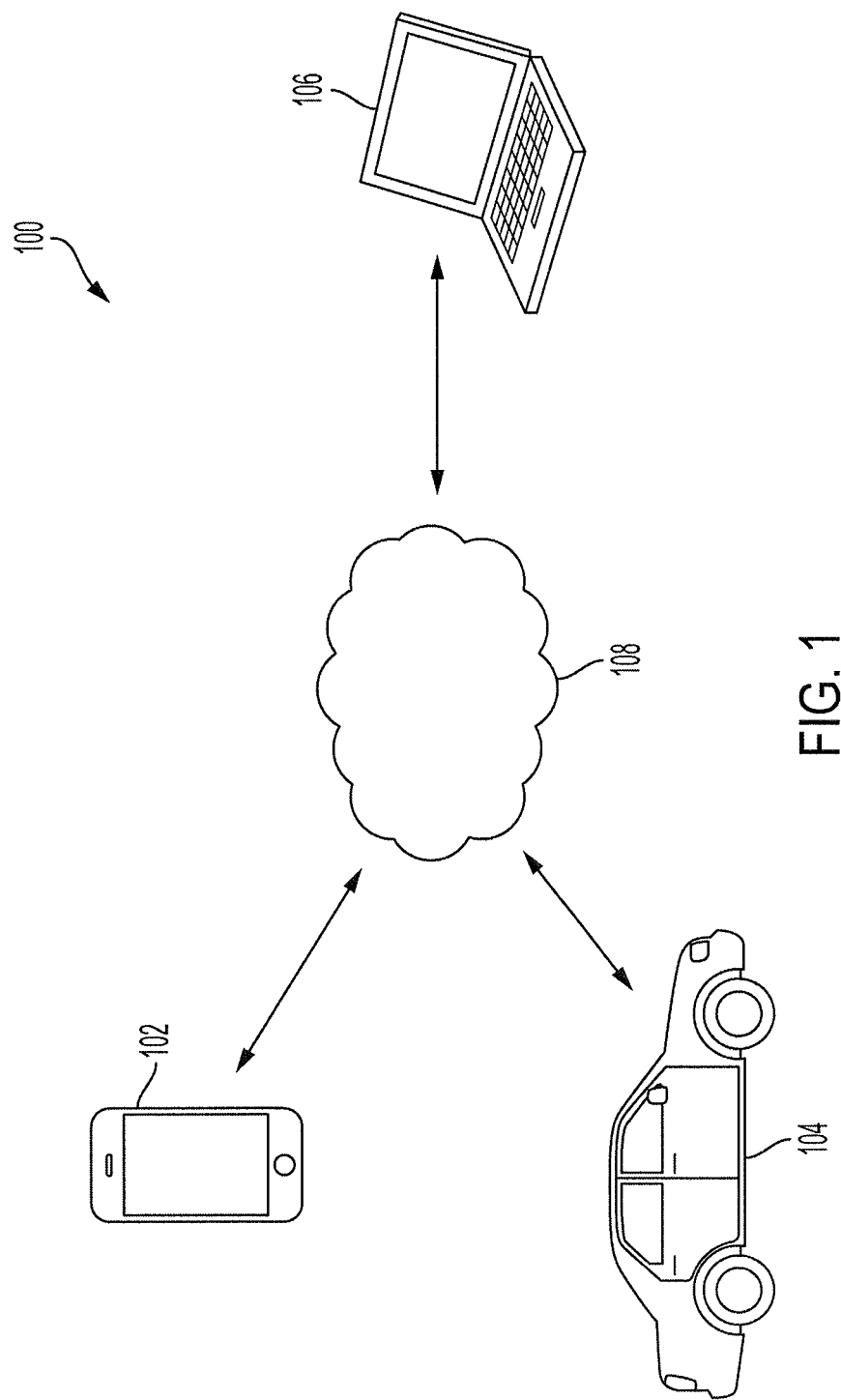
FIG. 1 is a block diagram illustrating a distributed ledger system, according to various embodiments of the invention.

FIG. 1 is a block diagram illustrating a distributed ledger (e.g., blockchain) system 100. The system 100 includes one or more computing devices, such as a smartphone 102, a vehicle 104, or a computer 106, for example. The computing devices 102, 104, and 106 are associated with one or more distributed ledgers. The computing devices 102, 104, and 106 may be associated with vehicle owners, companies, vehicle manufacturers, or vehicle service providers, for example. The computing devices 102, 104, and 106 may maintain and/or update the ledgers. Each computing device 102, 104, and 106 may be configured to store a version of the distributed ledger. Each computing device 102, 104, and 106 may update the ledger by adding ledger entries or updating existing ledger entries.

A distributed ledger may be represented on a blockchain. The use of storing a record on a distributed ledger allows for other entities to check, verify, and/or validate the record placed on the distributed ledger. Moreover, the distributed ledger functions as an immutable record of the recorded information. The immutable record prevents others from tampering with, modifying or deleting any of the records on the distributed ledger. The computing devices 102, 104, and 106 may be connected to each other and/or to other computing devices via the network 108. A ledger may be stored on a plurality of computing devices, each acting as a node in a distributed architecture for storing a copy of the ledger. In this way, the ledger is collaboratively maintained (possibly anonymously) by any number of computing devices on a network. In some embodiments, the ledger is stored and maintained on a set of trusted computing devices such as the computing devices of authorized users. In some embodiments, a combination of both trusted computing devices and non-verified computing devices are used. In these embodiments, the same or different rules may be applied based on whether the computing device is a trusted computing device or a non-verified computing device. In some embodiments, there may be different levels of nodes with different trust and validation levels.

The ledgers, ledger entries, and/or information stored on the ledger entries may be used for recording vehicle data, which may include location data, fuel data, entertainment data, driving pattern data, interactions between vehicles, and smart contracts, for example. Smart contracts are computer functions located on a blockchain. The smart contracts may be used to facilitate an interaction between two or more parties.

In some embodiments, the ledger is publicly accessible to any computing device. In some embodiments, the ledger is only accessible to authorized computing devices providing the corresponding authentication credentials. In some embodiments, portions of the ledger are public and portions of the ledger are private. When the ledger is publicly accessible, the ledger may be configured so that identifiable information is removed but validation information is maintained. For example, a hash value generated based on particular data may be accessible on the ledger so that the data may be validated, but any identifiable information is obscured.

Figure 2:
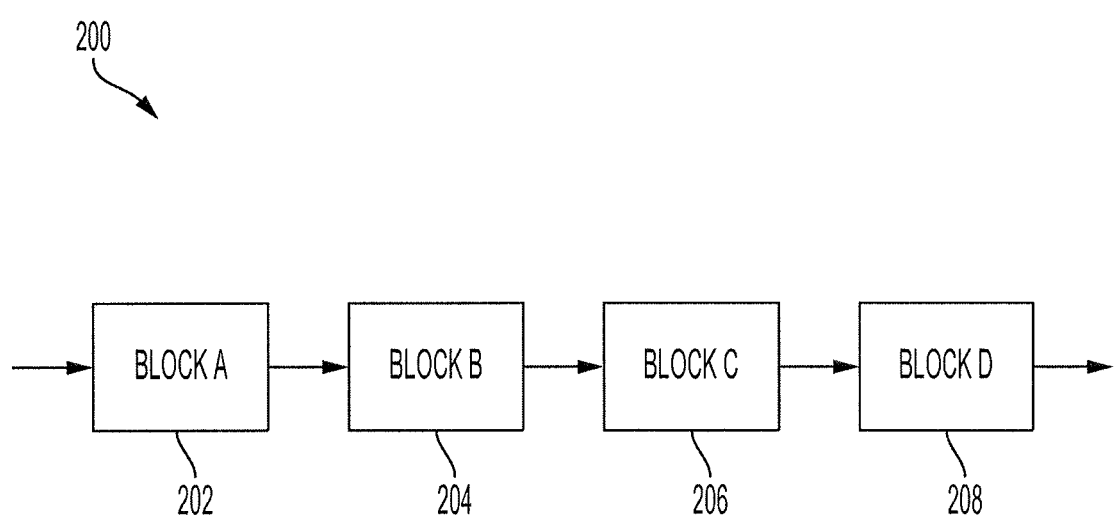
FIG. 2 illustrates a blockchain that may be used in the systems described herein, according to various embodiments of the invention.

FIG. 2 illustrates a blockchain 200 that may be used in the systems described herein. The blockchain 200 includes Block A 202, Block B 204, Block C 206, and Block D 208. In some embodiments, the blockchain 200 is associated with one particular vehicle. In other embodiments, the blockchain 200 is associated with one particular user, such as in situations where transportation is provided as a service, and the user may use any number of different vehicles for transportation.

Each block may include an identifier associated with the vehicle or the user. Each block may also include a time and date indicator identifying when the block was created. When blocks are linked, as the blocks 202-208 are, the blocks may be linked by a hash value based on the contents of the block(s), so that if the block(s) were ever tampered with, the corresponding hash value would change, and the once-connected blocks would no longer be connected. In this way, the hash value connection between the blocks facilitates prevention of changing of the values of the blocks.

Blocks may be created whenever an event occurs. For example, when the blockchain 200 is associated with a vehicle, Block A 202 may be created when the vehicle is manufactured, and Block A may include the vehicle details, such as make, model, vehicle identification number (VIN), color, manufacturing location, and manufacture date, for example. In the example, Block B 204 may be created when the vehicle is sold or leased, and Block B may include new owner information, previous owner information, cost of the vehicle, lender information, and mileage of the vehicle when sold, for example. Block C 206 may be created when the vehicle is driven from one place to another, and Block C may include the location of the first place and the location of the second place, as well as travel time and travel distance, for example. Block D 208 may be created when a vehicle routine is determined, such as a morning and evening commute, for example.

In another example, when the blockchain 200 is associated with a user who uses transportation as a service (e.g., ride sharing, taxi, or limousine), Block A 202 may be created when a user account associated with the user is created, and Block A 202 may include the user's name, the location of the user, billing information of the user, address of the user, and demographic information of the user, for example. In the example, Block B 204 may be created when the user takes a first trip from one place to another, and Block B may include the start location and destination location of the first trip, as well as travel time and travel distance, for example. Block C 206 may be created when the user adds a favorite location to the user's list of frequently traveled destinations. Block D 208 may be created when a user's routine is determined, such as a morning and evening commute, for example.

Figure 3:
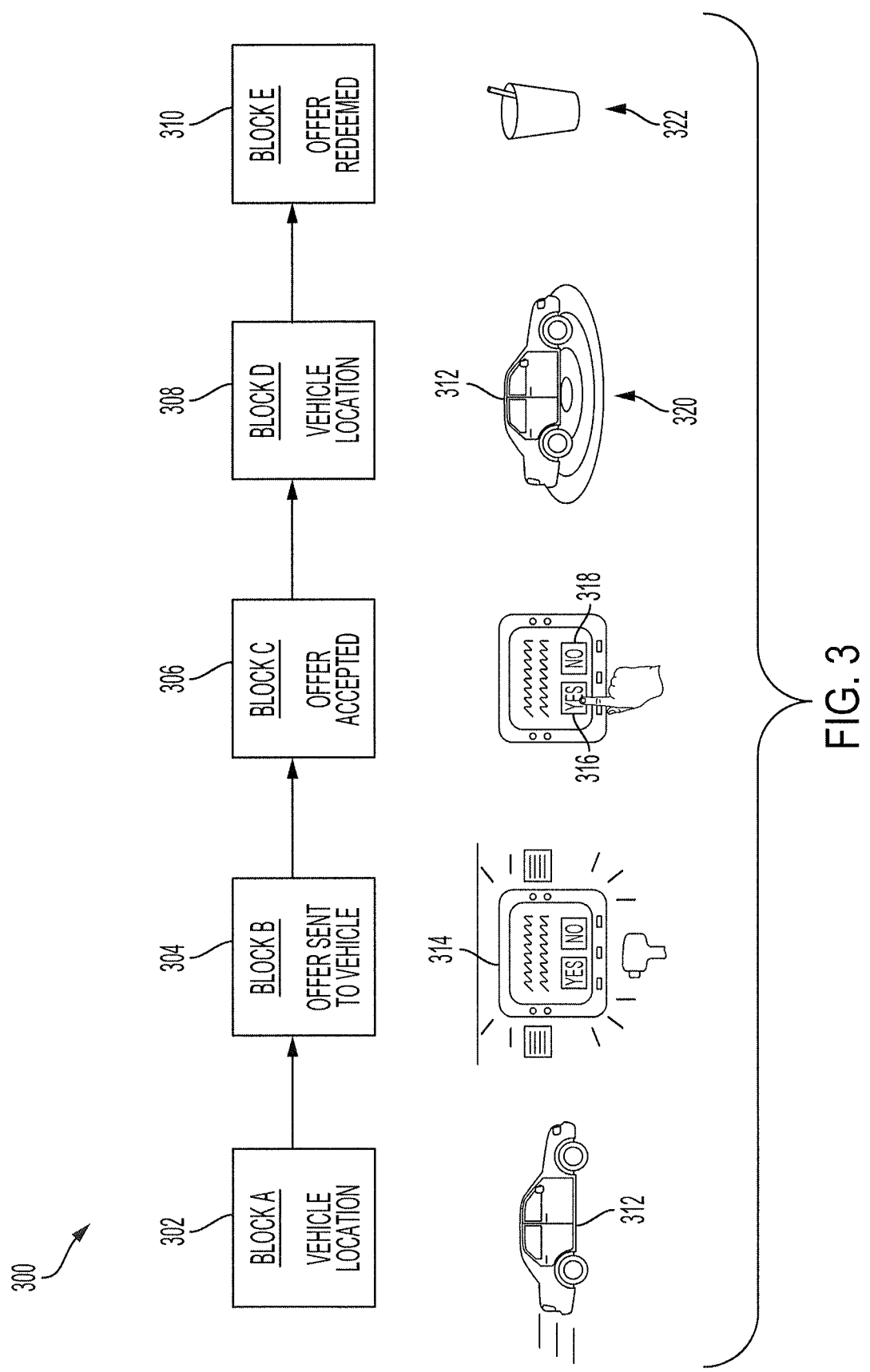
FIG. 3 illustrates a blockchain associated with a vehicle and corresponding events, according to various embodiments of the invention.

FIG. 3 illustrates a blockchain 300 associated with a vehicle 312 and corresponding events generated using the vehicle data.

When a travel routine is established based on the location history of the vehicle 312, Block A 302 is created. Block A may include the geographical location of the vehicle, the starting point and destination point of the routine of the vehicle, a typical travel route, a time range for the departure of the vehicle at the starting point, a typical travel distance, a typical travel time length, and typical stops made by the vehicle during the travel routine. For example, Block A may include latitude and longitude coordinates of the starting point, latitude and longitude coordinates of the destination location, 7:15 AM to 7:30 AM as a range of time of departure from the starting point, 17 miles as the travel distance, 31 minutes as the travel time length, and one stop made at Café Z 75% of the time.

The data on Block A 302 may be made available to a third-party company, such as an advertising company. The data on Block A 302 may be anonymized in order to protect the privacy of the user associated with the vehicle. In some embodiments, the first 10% and the last 10% of the travel route is removed. In some embodiments, a hash function may be performed on the VIN, the starting point, or the destination point to obscure the actual values of the VIN, the starting point, or the destination point. The terms "starting point" and "starting location" and "destination point" and "destination location" may be used interchangeably.

The third party may determine that based on the data in Block A 302, a targeted advertisement may be communicated to the vehicle 312. The targeted advertisement may be for a competitor café, and may be a coupon for 50% off of a particular beverage. The third party may determine that this promotion may be appealing to the user of the vehicle 312 because the vehicle stops at Café Z 75% of the time during the commute, as indicated in Block A 302.

The promotion is communicated to the vehicle 312, and the promotion appears on a display screen 314 inside of the vehicle 312. The display screen 314 may be part of an infotainment unit of the vehicle 312, or may be a display screen of a mobile device within the vehicle 312. The promotion may be communicated from the third party directly to the vehicle 312 or may be communicated from the third party to the manufacturer or other entity, which communicates the promotion to the vehicle 312. In some embodiments, the third party is authorized to creates blocks in the blockchain 300, and creates a block with the promotion details. The vehicle 312 may reference the newly created block on the updated blockchain 300 and may access the promotion details and then present the promotion to the user via the display screen 314.

Block B 304 is created, and Block B 304 includes the offering of the promotion to the vehicle. Block B 304 may include the promotion, any conditions associated with the promotion (e.g., locations where the promotion is honored, expiration of the promotion, any time constraints on the promotion), and the name of the merchant providing the promotion and good or service.

The user may accept the promotion by engaging a "Yes" icon 316 on the display screen 314 or the user may reject the promotion by engaging a "No" icon 318 on the display screen 314. Block C 306 is created, and Block C 306 includes the acceptance or rejection of the promotional offer by the user. As shown in FIG. 3, the user has accepted the promotional offer.

The vehicle 312 arrives at a location 320 associated with the promotion. Block D 308 is created, and Block D 308 includes the vehicle 312 location being a location associated with the promotion. In some embodiments, the promotion may not be available to be redeemed by the user unless the vehicle 312 has reached a particular location 320. The third party may trust that the vehicle 312 is actually at the particular location 320 when Block D 308 is created.

The user may redeem the promotion for a good or service 322. Block E 310 is created, and Block E 310 includes the redeeming of the promotion by the user. In some embodiments, when the promotion is activated by the vehicle 312 being at the particular location 320, a promotional code is automatically generated and sent to the user. The promotional code may be sent to the vehicle 312 or to a mobile device associated with the vehicle 312. Once the promotional code is redeemed, Block E 310 may be automatically created to reflect the fact that the user redeemed the promotion and that the promotion was successful.

The vehicle location data may be further tracked by subsequent blocks in the blockchain 300. The third party may be able to determine whether the promotions result in any change of behavior for the user by viewing the subsequent locations travelled to by the vehicle 312. Because the blocks of the blockchain 300 are written in a temporally linear manner, a causal effect of the promotions in a user's behavior is relatively easy to identify, and computationally efficient. By comparison, if a conventional database of all user and vehicle activity were to be maintained, the database would have to be sorted and filtered in order to determine any changes in the user's behavior, and this sorting and filtering may be substantially computationally costly, as there may be a substantial amount of data to sort and filter.

In some embodiments, a smart contract (located on the blockchain 300 or another blockchain) may be used such that when the vehicle 312 arrives at the location 320 associated with the promotion, the location of the vehicle 312 is provided to the smart contract, and the smart contract automatically provides a communication to the company associated with the promotion, an indication that the promotion has been redeemed, and an instruction to facilitate redemption of the offer by the vehicle 312. In this way, the smart contract allows the user of the vehicle 312 to trust that when the user meets the user's end of the agreement (e.g., arriving at the location 320), the company associated with the promotion will automatically uphold their end of the agreement, and at minimum, there will be a trusted record on the blockchain 300 that the user upheld their end of the agreement.

Figure 4B:
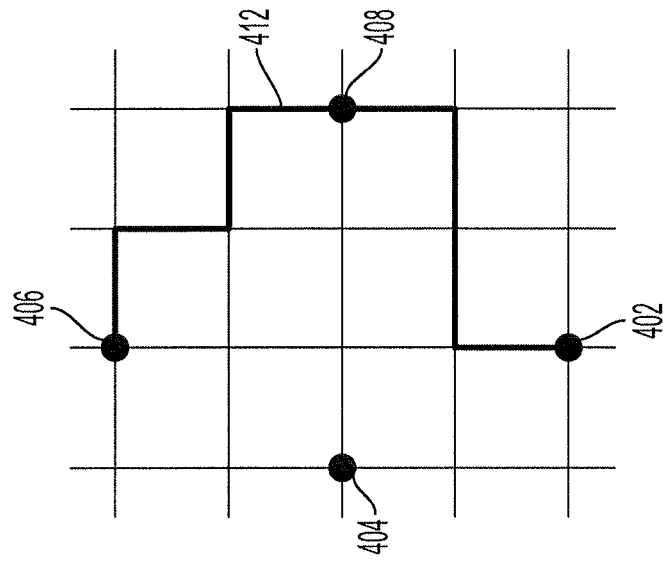
FIG. 4B illustrates a second route of a commute taken by a vehicle after a communication is presented to the vehicle, according to various embodiments of the invention.
Figure 4A:
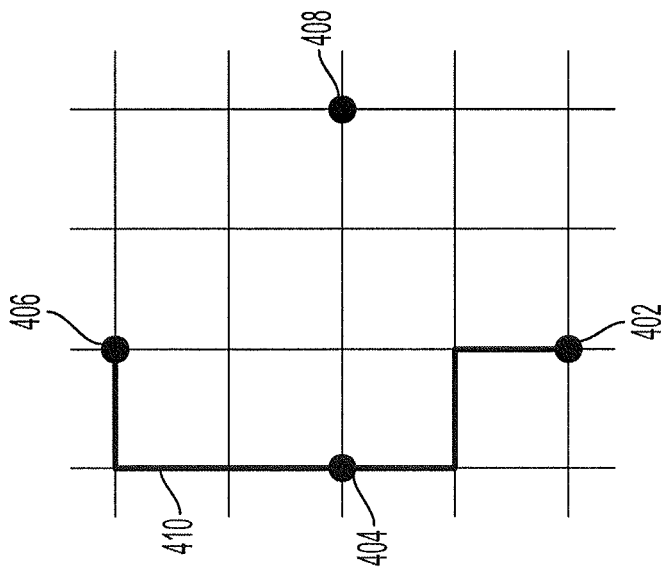
FIG. 4A illustrates a first route of a commute taken by a vehicle before a communication is presented to the vehicle, according to various embodiments of the invention.

FIG. 4A illustrates a first route 410 of a commute taken by a vehicle from a starting point 402 to a destination point 406 with a stop 404 along the way. For example, the first route 410 may be a daily morning commute for a user, the starting point 402 may be the user's house, the destination point 406 may be the user's workplace, and the stop 404 may be a coffee shop that the user frequents on the user's way to work.

Once the first route 410 is determined to be a regular commute of the user, the first route 410 and associated data may be included in a distributed ledger (e.g., in a block of a blockchain). In some embodiments, the entire first route 410 with all of the streets traversed and the turns made may be included, as well as the starting point 402, the destination point 406, and the stop 404. In some embodiments, a portion of the user's commute from home to work may be removed, such as a beginning portion and an end portion, in order to anonymize the data. For example, the starting point 402 may be, in reality, not associated with a location of significance to the user, and the user's house may be a different location (not starting point 402). Similarly, the destination point 406 may be, in reality, not associated with a location of significance to the user, and the user's workplace may be a different location (not destination point 406).

A third party may view the first route 410 and the associated data that is accessible on the distributed ledger, and may determine that there is an opportunity to provide a promotional offer to the user, based on the stop 404. The third party may provide a promotional offer for a competitor. The user may redeem the promotional offer one or more times, and eventually, the user may adjust the commute to incorporate the competitor's location.

FIG. 4B illustrates a second route 412 that the user takes, and the second route 412 may also be included in the distributed ledger once it is determined that the second route 412 is a new commuting route for the user. The second route 412 includes the same starting point 402 and destination point 406, but now includes a new stop 408. The new stop 408 may be associated with the competitor for which promotional offers were made to the user.

By viewing the changed commuting route, from the first route 410 to the second route 412 via the distributed ledger, the third party is able to identify that the promotional offers were effective in changing the user's routine.

While FIGS. 3 and 4A-4B illustrate a process of offering and accepting a promotion based on location data using a distributed ledger, promotions or other advertisements may be provided to a vehicle based on other vehicle data, such as fuel data, and may be provided to a user based on other user data, such as user schedule data.

For example, a fuel amount (e.g., gasoline level for internal combustion engine vehicles or state of charge for electric vehicles) may be included in a block on the blockchain. A third party may detect a particular level of fuel (e.g., fuel level less than a threshold fuel amount) based on the information on the block on the blockchain, and may automatically communicate a promotion or advertisement to the vehicle. For example, when the vehicle is an electric vehicle, the promotion or advertisement may include a discounted rate for the vehicle to recharge, but may only be redeemed at a particular charging station. The communication of the offer to the vehicle may be included in the blockchain. In addition, acceptance or rejection of the offer may be included in the blockchain.

The vehicle location data may indicate that the vehicle has arrived at the particular charging station where the offer may be redeemed. This location data may be included in the blockchain. The third party may automatically perform actions based on the vehicle arriving at the particular charging station. For example, the charging station may automatically reserve a charging location for the vehicle based on the vehicle's arrival at the charging station. The charging station may also automatically provide the promotional charging rate for the vehicle when the vehicle begins charging at the charging station. That the offer was redeemed may also be included in the blockchain. In this way, a linear tracking of vehicle activity with respect to the third party and the charging station may be recorded, and any future incorporation of the charging station into the travel of the vehicle may be detected.

In another example, an event that the user is scheduled to attend is included in a block on the blockchain. This schedule data may be anonymized by obscuring the user's name and any other personally identifiable information associated with the user. The schedule data on the blockchain may be automatically analyzed by a third party and a promotional offer associated with the event may be automatically communicated to the user. For example, the event may be a concert or sporting event, and the promotional offer may be discounted or premium parking for the event.

The offer may be accepted or rejected by the user. The presentation of the offer to the user may be included in the blockchain, as well as the acceptance or rejection thereof by the user. If the offer is accepted, once the user arrives at the location corresponding to the promotion, an indication that the user has arrived at the location is included in the blockchain. The location (in this example, a parking lot) may take one or more actions based on the user's arrival at the location. The parking lot may automatically let the user in to the parking lot. The parking lot may also have a space reserved for the user when the user accepted the offer, and the space may be lit up with lights to attract the user's attention.

In some embodiments, a company-specific token may be issued and communicated to the vehicle as part of the promotional offer. The company-specific token may be trusted by the user of the vehicle, as it is created on the blockchain itself, and the company issuing the company-specific token may be assured that the token may not be modified or altered, as it is on the blockchain.

Figure 5:
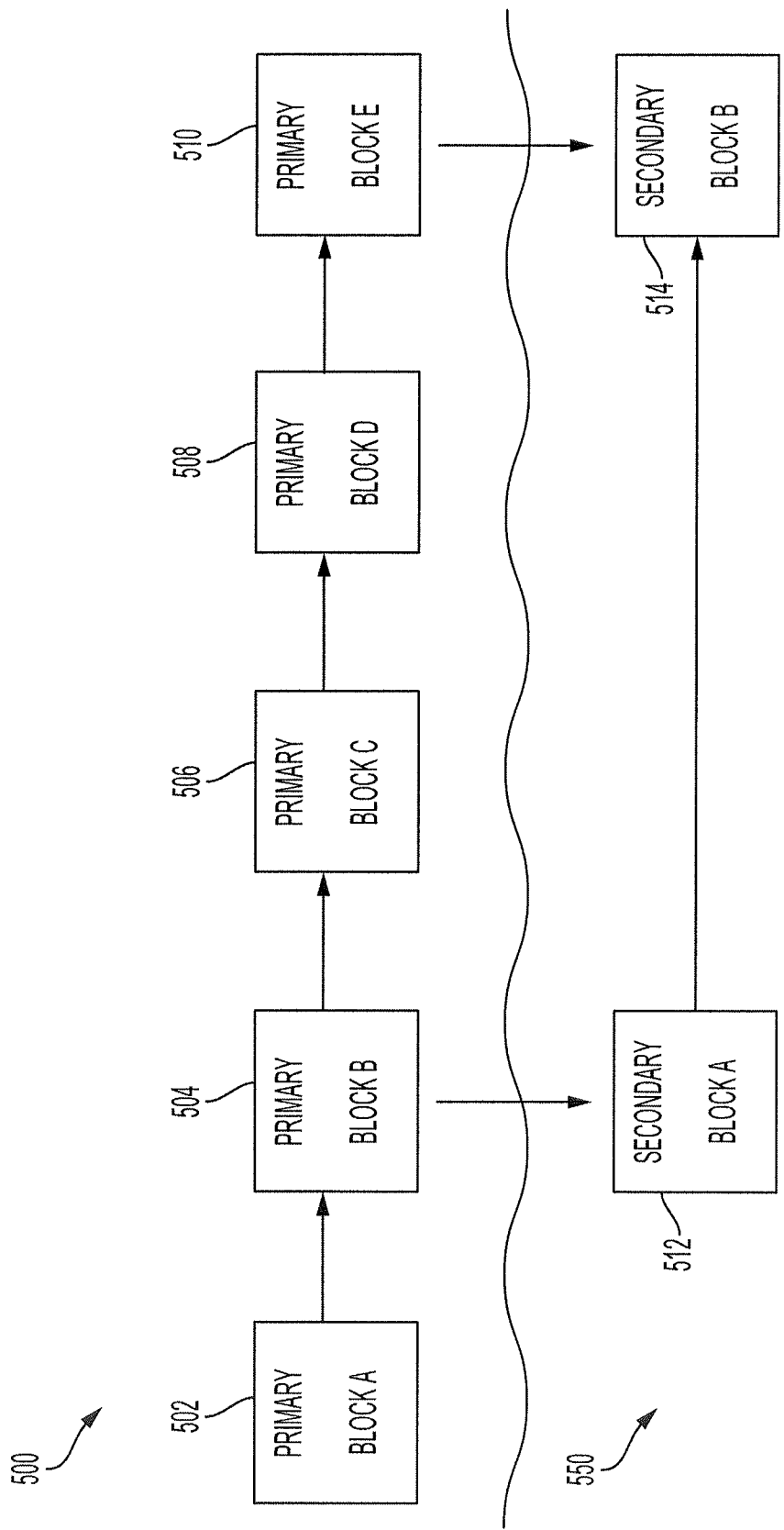
FIG. 5 illustrates an example architecture of a primary blockchain and a secondary blockchain, according to various embodiments of the invention.

In order to improve the anonymity of the vehicle data or the user data on the blockchain, a secondary blockchain may be used. FIG. 5 illustrates an example architecture of a secondary blockchain. A primary blockchain 500 may be used to record vehicle data or user data (e.g., blockchain 200 and blockchain 300). For example, Primary Block A 502 may include vehicle ownership data or user account data, Primary Block B 504 may include fuel data, Primary Block C 506 may include schedule data, Primary Block D 508 may include payment transaction data, and Primary Block E 510 may include location data. The primary blockchain 500 may not be publicly accessible, and may be protected by one or more layers of security, such as access credentials and authentication tokens, for example.

However, some of the blocks in the primary blockchain 500 may not have personally identifiable information and may be suitable for public sharing. These blocks may be linked to a block on the secondary blockchain 550. For example, the Primary Block B 504 which includes fuel data may not include any personally identifiable information about the vehicle or the user with which it is associated and may be copied to a Secondary Block A 512. Any third party or other public entity may be able to view the Secondary Block A 512 without being able to ascertain any personal information about the vehicle or the user associated with the primary blockchain 500.

Similarly, the Primary Block E 510 which includes location data may only include the location of the vehicle at a particular time and date and may not include any personally identifiably information about the vehicle or the user. Accordingly, it may be suitable for public sharing. The contents of Primary Block E 510 may be copied to Secondary Block B 514, which may be linked to Secondary Block A 512.

The temporal order of the events of the primary blockchain 500 is maintained on the secondary blockchain 550, without any of the personally identifiable information in the primary blockchain 500 being available for public inspection. In this way, the primary blockchain 500 may be considered a private blockchain, and the secondary blockchain 550 may be considered a public blockchain. In some embodiments, a computing device automatically determines which blocks in the primary blockchain 500 may be suitable for being copied to the secondary blockchain 550. In some embodiments, when the blocks of the primary blockchain 500 are created, they include an identifier indicating whether the contents are suitable for public viewing (e.g., they do not have any personally identifiable information).

Figure 6:
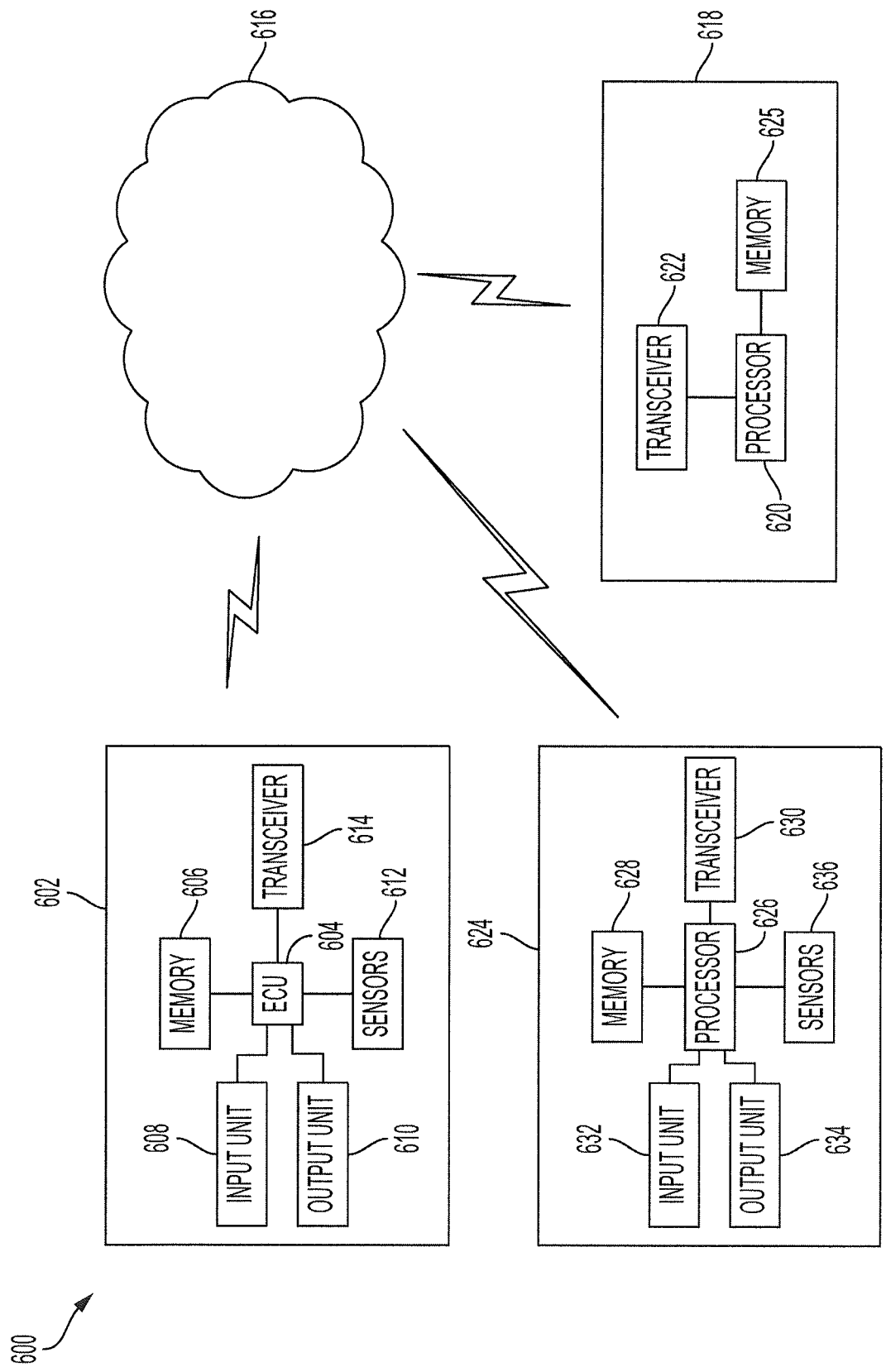
FIG. 6 illustrates a block diagram of the systems described herein, according to various embodiments of the invention.

FIG. 6 illustrates an example system 600, according to various embodiments of the invention. The system 600 includes a vehicle 602.

The vehicle 602 may have an automatic or manual transmission. The vehicle 602 is a conveyance capable of transporting a person, an object, or a permanently or temporarily affixed apparatus. The vehicle 602 may be a self-propelled wheeled conveyance, such as a car, a sports utility vehicle, a truck, a bus, a van or other motor or battery driven vehicle. For example, the vehicle 602 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 602 may be a semi-autonomous vehicle or an autonomous vehicle. That is, the vehicle 602 may be self-maneuvering and navigate without human input. An autonomous vehicle may use one or more sensors and/or a navigation unit to drive autonomously.

The vehicle 602 also includes one or more computers or electronic control units (ECUs) 604, appropriately programmed, to control one or more operations of the vehicle. The one or more ECUs 604 may be implemented as a single ECU or in multiple ECUs. The ECU 604 may be electrically coupled to some or all of the components of the vehicle. In some embodiments, the ECU 604 is a central ECU configured to control one or more operations of the entire vehicle. In some embodiments, the ECU 604 is multiple ECUs located within the vehicle and each configured to control one or more local operations of the vehicle. In some embodiments, the ECU 604 is one or more computer processors or controllers configured to execute instructions stored in a non-transitory memory 606.

The vehicle 602 includes one or more sensors 612 configured to detect various sensor data. The one or more sensors 612 may include a location sensor configured to detect location data associated with the vehicle 602. The location sensor may be a GPS unit, and the location data may be in the format of latitude and longitude coordinates. The one or more sensors 612 may include a fuel sensor configured to detect fuel data. The fuel may be a combustible gasoline or may be electrical charge stored in a battery. The fuel data may indicate a remaining amount of fuel, a remaining percentage of fuel, and/or a maximum storable amount of fuel.

The vehicle 602 may include an input unit 608 configured to receive input from a user, such as an occupant of the vehicle. The input unit 608 may be a touchscreen display of an infotainment unit, a keyboard, a camera configured to detect motions, a microphone, or one or more dials and/or buttons. The input unit 608 may be used to receive an indication from the user of acceptance or rejection of a promotional offer from a third party.

The vehicle 602 may also include an output unit 610 configured to provide an output to the user, such as an occupant of the vehicle. The output unit 610 may be a display or a speaker, for example. The output unit 610 may be used to present the promotional offer from the third party.

The vehicle 602 may also include a transceiver 614. The transceiver 614 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 614 may transmit data to and receive data from devices and systems not directly connected to the vehicle 602. The transceiver 614 may access the network 616.

The network 616 may be a local area network (LAN), a wide area network (WAN), a cellular network, a digital short-range communication (DSRC), the Internet, or a combination thereof, and may connect the vehicle 602 to one or more computing devices, including one or more servers from different service providers. Each of the one or more servers may be connected to one or more databases. A service provider may provide navigational map, weather and/or traffic data to the vehicle 602.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such the grade of an incline of a road, a terrain type of the road, or a curvature of the road. The construction information includes construction features such as construction zones and construction hazards.

The traffic data includes one or more traffic condition features, such as traffic congested areas or accident areas. The traffic data may provide information related to the density and movement of vehicles on a roadway and/or information related to accident locations.

The features, e.g., road features, political features, or traffic data, each have a location that may be identified by map coordinates. The map coordinates may be defined by latitude and longitude coordinates.

The memory 606 is connected to the ECU 604 and may be connected to any other component of the vehicle 602. The memory 606 is configured to store any data described herein, such as the map data, the location data, and any data received via the transceiver 614.

The system 600 may also include a computing device 624 associated with a user. The computing device 624 may be any computing device, such as a laptop, a smartphone, a tablet, or a wearable device, for example. The computing device 624 associated with the user may be used in the system 600 when the user is not associated with one particular vehicle, such as situations where transportation is a service (e.g., taxis, ride sharing, limousines, etc.). The computing device 624 may be associated with a user identification or identifier, and a distributed ledger (e.g., blockchain 200 or blockchain 300) may be associated with the user identification.

The computing device 624 associated with the user includes a processor 626, a memory 628, a transceiver 630, an input unit 632, an output unit 634, and one or more sensors 636. The processor 626 (and any processors described herein) may be one or more computer processors configured to execute instructions stored on a non-transitory memory. The memory 628 may be a non-transitory memory configured to store the instructions to be executed by the processor 626.

The transceiver 630 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 630 may transmit data to and receive data from devices and systems not directly connected to the computing device 624 associated with the user. The transceiver 630 may access the network 616.

The input unit 632 is configured to receive input from the user. The input unit 632 may be a touchscreen display, a keyboard, a camera configured to detect motions, a mouse, or a microphone. The input unit 632 may be used to receive an indication from the user of acceptance or rejection of a promotional offer from a third party.

The output unit 634 is configured to provide an output to the user. The output unit 634 may be a display screen or a speaker, for example. The output unit 634 may be used to present the promotional offer from the third party.

The sensors 636 may include a location sensor configured to detect location data associated with the computing device 624 associated with the user. The location sensor may be a GPS unit, and the location data may be in the format of latitude and longitude coordinates.

The memory 628 may also be configured to store user data, such as user schedule data indicating future plans of the user, user communication data associated with any communications to and from the user (e.g., text message data or email data), or user commute data indicating the commuting schedule of the user.

The location data and/or the user data may be used by a third party to determine whether a promotional offer or advertisement should be presented to the user. For example, when the user schedule data indicates that the user plans to take a trip departing from LAX in Los Angeles, Calif., a third party may offer a promotional long-term parking rate or a promotional transportation service rate to LAX.

The system 600 also includes a computing device 618 associated with a third party. The third party may be an advertising company contracted by one or more merchants of goods and/or services to present promotional offers and advertisements to users on behalf of the one or more merchants. The computing device 618 includes a processor 620, a transceiver 622, and a memory 624. The processor 620 may be one or more computer processors configured to execute instructions stored on a non-transitory memory. The memory 624 may be a non-transitory memory configured to store the instructions to be executed by the processor 620.

The transceiver 622 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 622 may transmit data to and receive data from devices and systems not directly connected to the computing device 618 associated with the third party. The transceiver 622 may access the network 616.

The processor 620 of the computing device 618 associated with the third party may be configured to automatically analyze sensor data from the vehicle 602 or the computing device 624 associated with the user and automatically determine one or more promotional offers to communicate to the vehicle 602 or the computing device 624. The processor 620 may also be configured to automatically analyze subsequent user behavior (as available on the distributed ledger) to determine whether one or more previously provided promotional offers were effective in influencing the future behavior of the user. The processor 620 may use machine learning techniques to improve future promotional offer communications based on the results of previously provided promotional offers. In this way, the process of providing promotional offers may be automated using computer devices.

As used herein, a "unit" may refer to hardware components, such as one or more computer processors, controllers, or computing devices configured to execute instructions stored in a non-transitory memory.

Figure 7:
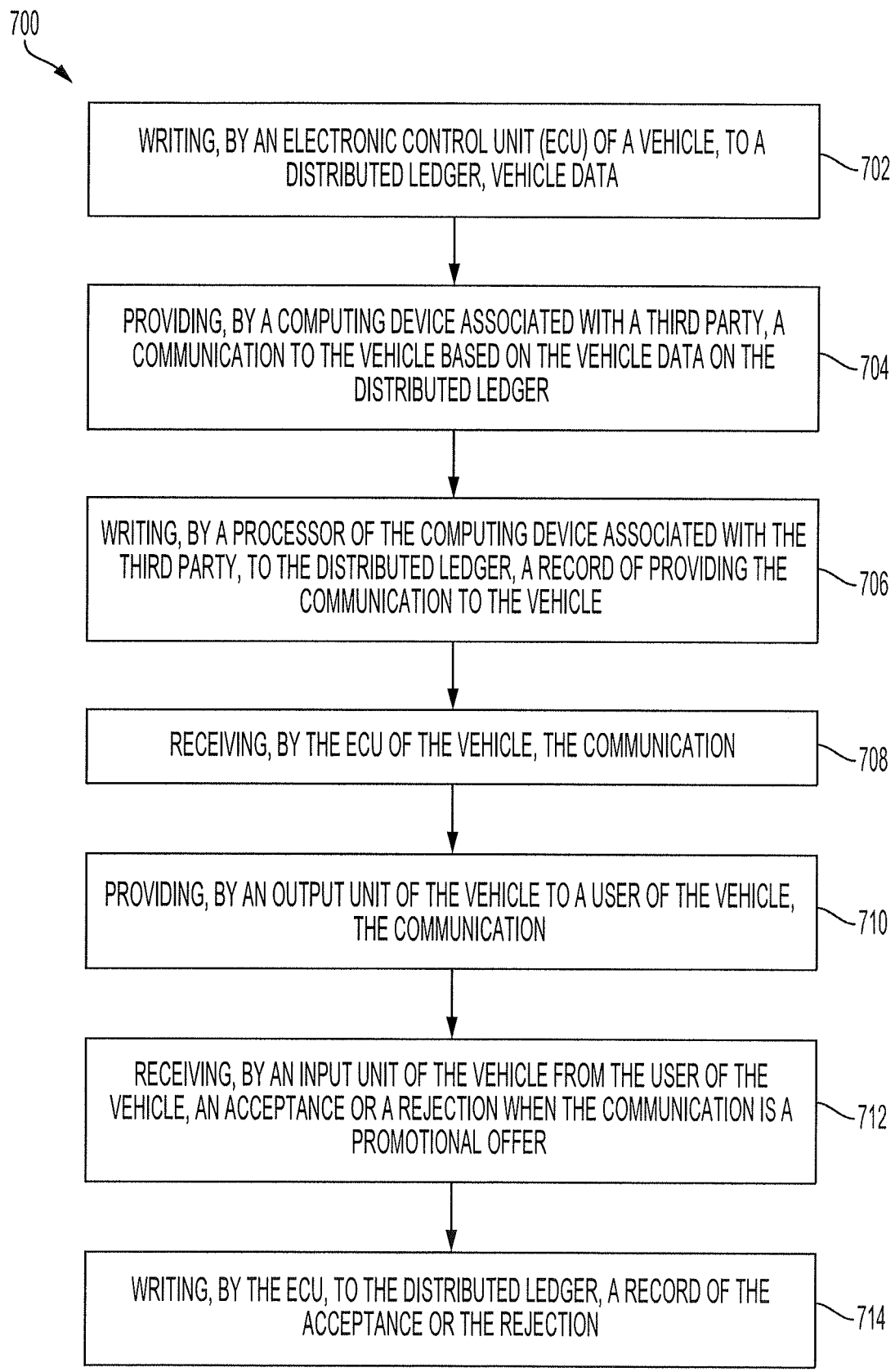
FIG. 7 illustrates a flow diagram of a process using vehicle data, according to various embodiments of the invention.

FIG. 7 illustrates a flow diagram of a process 700 performed by the systems described herein, according to various embodiments of the invention. In particular, the process 700 is performed when a user is associated with a particular vehicle, and vehicle data is recorded on the distributed ledger.

An electronic control unit (ECU) (e.g., ECU 604) of a vehicle (e.g., vehicle 602) writes vehicle data to a distributed ledger (step 702). In some embodiments, the distributed ledger is a blockchain and the ECU writes the vehicle data to a block on the blockchain. In some embodiments, a copy of the distributed ledger is stored locally on the vehicle. In some embodiments, the vehicle data includes at least one of location data of the vehicle and fuel data of the vehicle.

A computing device (e.g., computing device 618) associated with a third party analyzes the vehicle data on the distributed ledger and determines whether a communication should be made. The third party may be an advertising company, or the third party may be a merchant of goods or services. The communication may be an advertisement or a promotional offer. In some embodiments, a processor (e.g., processor 620) of the computing device associated with the third party determines whether the communication should be made. In some embodiments, the processor is capable of using machine learning techniques to determine whether the cost of transmitting the communication is worth the benefit from the communication.

The computing device associated with the third party provides the communication to the vehicle (step 704). In some embodiments, the communication is provided directly from the computing device associated with the third party to the vehicle via a computing device transceiver (e.g., transceiver 622) and a vehicle transceiver (e.g., transceiver 614). In some embodiments, the communication is relayed by one or more other computing devices across a network (e.g., network 616) from the computing device associated with the third party to the vehicle.

The processor of the computing device associated with the third party writes a record of the providing of the communication to the distributed ledger (step 706). In this way, the distributed ledger may reflect all of the interactions between the vehicle and one or more other computing devices.

The ECU of the vehicle receives the communication (step 708). The ECU of the vehicle then provides, by an output unit (e.g., output unit 610), the communication (step 710). The output unit may be a display screen or a speaker. When the communication is a promotional offer, the user may accept or decline the promotional offer. The promotional offer may be exclusive to a particular merchant or exclusive to a particular location of a chain of merchants. The promotional offer may be a token issued by the merchant.

An input unit (e.g., input unit 608) of the vehicle receives an acceptance or a rejection of the communication from the user when the communication is a promotional offer (step 712). The input unit may be a touchscreen or a microphone. A record of the response of the user is then recorded to the distributed ledger by the ECU (step 714).

In some embodiments the vehicle or the computing device associated with the third party communicates an indication that the promotional offer was accepted by the user to an entity associated with the promotional offer. In some embodiments, the entity associated with the promotional offer may check the distributed ledger to determine whether the user accepted the promotional offer. In some embodiments, a smart contract on the distributed ledger automatically performs actions in response to the user accepting the promotional offer. For example, when the user accepting the promotional offer is provided to the smart contract, the smart contract may automatically communicate a redemption code to the vehicle or may automatically perform actions at the physical location associated with the promotional offer.

Figure 8:
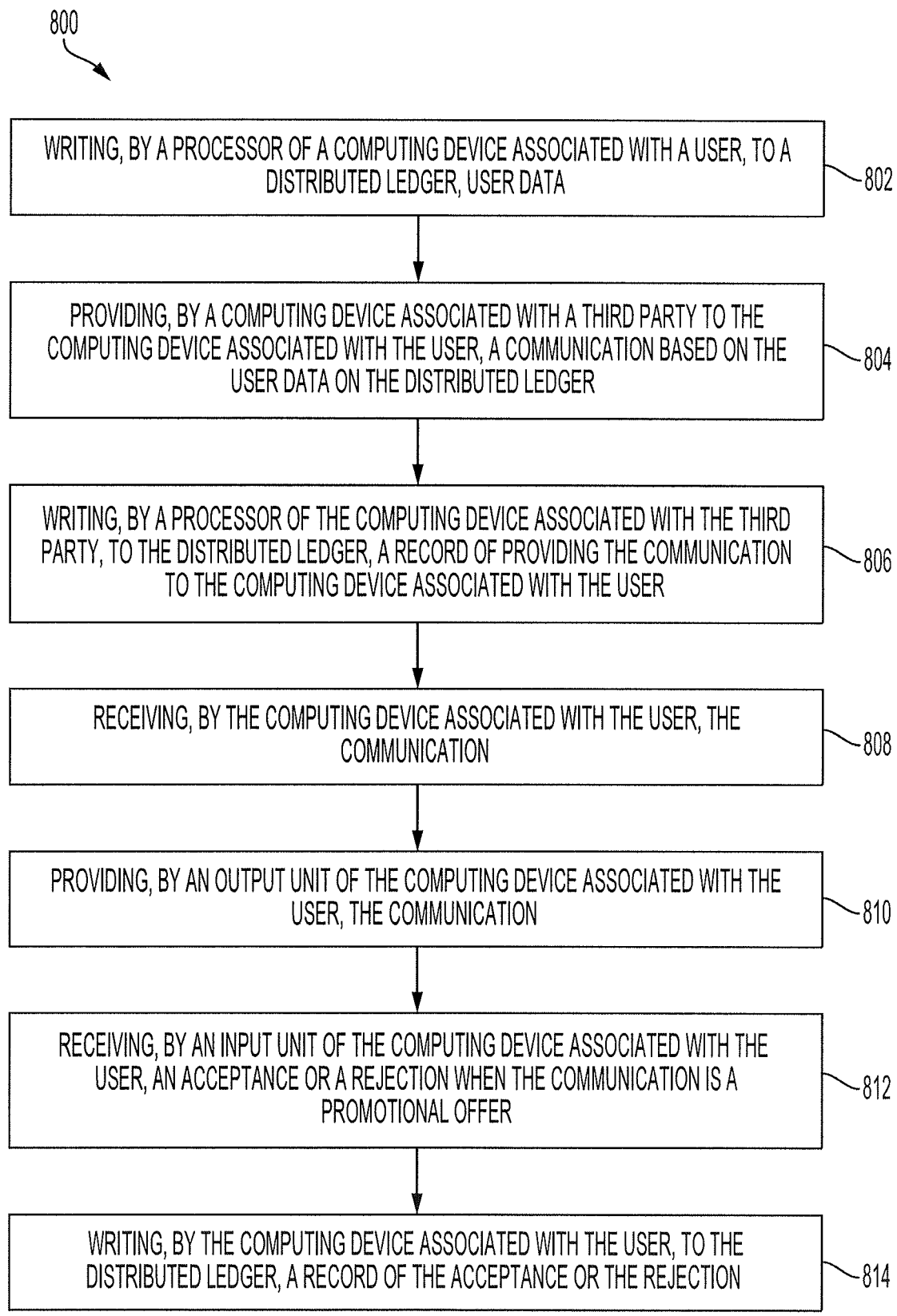
FIG. 8 illustrates a flow diagram of a process using user data, according to various embodiments of the invention.

FIG. 8 illustrates a flow diagram of a process 800 performed by the systems described herein, according to various embodiments of the invention. In particular, the process 800 is performed when a user is not exclusively tied to a particular vehicle, and a computing device associated with a user records user data to a distributed ledger.

A processor (e.g., processor 626) of a computing device (e.g., computing device 624) associated with a user writes user data to a distributed ledger (step 802). In some embodiments, the distributed ledger is a blockchain and the processor writes the user data to a block on the blockchain. In some embodiments, a copy of the distributed ledger is stored locally on the computing device associated with the user. In some embodiments, the user data includes at least one of location data of the user, user schedule data, user commute data, or user communication data.

A computing device (e.g., computing device 618) associated with a third party analyzes the user data on the distributed ledger and determines whether a communication should be made. The third party may be an advertising company, or the third party may be a merchant of goods or services. The communication may be an advertisement or a promotional offer. In some embodiments, a processor (e.g., processor 620) of the computing device associated with the third party determines whether the communication should be made. In some embodiments, the processor is capable of using machine learning techniques to determine whether the cost of transmitting the communication is worth the benefit from the communication.

The computing device associated with the third party provides the communication to the computing device associated with the user (step 804). In some embodiments, the communication is provided directly from the computing device associated with the third party to the computing device associated with the user via a third-party computing device transceiver (e.g., transceiver 622) and a user computing device transceiver (e.g., transceiver 630). In some embodiments, the communication is relayed by one or more other computing devices across a network (e.g., network 616) from the computing device associated with the third party to the computing device associated with the user.

The processor of the computing device associated with the third party writes a record of the providing of the communication to the distributed ledger (step 806). In this way, the distributed ledger may reflect all of the interactions between the computing device associated with the user and one or more other computing devices.

The computing device associated with the user receives the communication (step 808). An output unit (e.g., output unit 634) of the computing device associated with the user provides the communication to the user (step 810). The output unit may be a display screen or a speaker. When the communication is a promotional offer, the user may accept or decline the promotional offer. The promotional offer may be exclusive to a particular merchant or exclusive to a particular location of a chain of merchants. The promotional offer may be a token issued by the merchant.

An input unit (e.g., input unit 632) of the computing device associated with the user receives an acceptance or a rejection of the communication from the user when the communication is a promotional offer (step 812). The input unit may be a touchscreen or a microphone. A record of the response of the user is then recorded to the distributed ledger by the computing device associated with the user (step 814). In some embodiments, the processor of the computing device associated with the user writes the record of the response of the user to the distributed ledger.

In some embodiments the computing device associated with the user or the computing device associated with the third party communicates an indication that the promotional offer was accepted by the user to an entity associated with the promotional offer. In some embodiments, the entity associated with the promotional offer may check the distributed ledger to determine whether the user accepted the promotional offer. In some embodiments, a smart contract on the distributed ledger automatically performs actions in response to the user accepting the promotional offer. For example, when the user accepting the promotional offer is provided to the smart contract, the smart contract may automatically communicate a redemption code to the computing device associated with the user or may automatically perform actions at the physical location associated with the promotional offer.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for recording vehicle data, the method comprising:

writing, by an electronic control unit (ECU) of a vehicle, to a first block of a private blockchain distributed ledger, vehicle data including a travel routine based on vehicle location data, the private blockchain distributed ledger being stored on a plurality of computing devices, each computing device of the plurality of computing devices acting as a node in a distributed architecture for storing respective copies of the private blockchain distributed ledger and collaboratively maintaining the private blockchain distributed ledger;

selectively writing, by the ECU, a portion of the vehicle data written on the private blockchain distribution ledger, the portion not including any personally identifiable information, to a first block of a public blockchain distribution ledger;

providing, by a computing device associated with a third party, a communication to the vehicle based on the travel routine on the public blockchain distributed ledger;

writing, by a processor of the computing device associated with the third party, to a second block of the public blockchain distributed ledger, a record of providing the communication to the vehicle;

receiving, by the ECU of the vehicle, the communication;

writing, by the ECU, to a third block of the public blockchain distributed ledger, further vehicle location data after receiving the communication, the further vehicle location data being associated with the communication; and comparing, by the processor of the computing device associated with the third party, the further vehicle location data of the third block with the travel routine of the first block of the public blockchain distribution ledger to determine a deviation of the vehicle from the travel routine to the further vehicle location based on the communication.

2. The method of claim 1, further comprising:
providing, by an output unit of the vehicle to a user of the vehicle, the communication;
receiving, by an input unit of the vehicle from the user of the vehicle, an acceptance or a rejection when the communication is a promotional offer; and
writing, by the ECU, to the public blockchain distributed ledger, a record of the acceptance or the rejection.

3. The method of claim 2, further comprising communicating, to an entity associated with the promotional offer, an indication that the promotional offer was accepted when the promotional offer is accepted by the user of the vehicle.

4. A method for recording user data associated with transportation, the method comprising:
writing, by a processor of a computing device associated with a user, to a first block of a private blockchain distributed ledger, user data including a travel routine based on user location data, the private blockchain distributed ledger being stored on a plurality of computing devices, each computing device of the plurality of computing devices acting as a node in a distributed architecture for storing respective copies of the private blockchain distributed ledger and collaboratively maintaining the private blockchain distributed ledger;
selectively writing, by the processor of the computing device associated with the user, a portion of the user data written on the private blockchain distribution ledger, the portion not including any personally identifiable information, to a first block of a public blockchain distribution ledger;
providing, by a computing device associated with a third party to the computing device associated with the user, a communication based on the travel routine on the public blockchain distributed ledger;
writing, by a processor of the computing device associated with the third party, to a second block of the public blockchain distributed ledger, a record of providing the communication to the computing device associated with the user;
receiving, by the computing device associated with the user, the communication;
writing, by the processor, to a third block of the public blockchain distributed ledger, further user location data after receiving the communication, the further user location data being associated with the communication; and
comparing, by the processor of the computing device associated with the third party, the further user location data of the third block with the travel routine of the first block of the public blockchain distribution ledger to determine a deviation of the user from the travel routine to the further user location based on the communication.

5. The method of claim 4, further comprising:
providing, by an output unit of the computing device associated with the user, the communication;
receiving, by an input unit of the computing device associated with the user, an acceptance or a rejection when the communication is a promotional offer; and
writing, by the computing device associated with the user, to the public blockchain distributed ledger, a record of the acceptance or the rejection.

6. The method of claim 5, further comprising communicating, to an entity associated with the promotional offer, an indication that the promotional offer was accepted when the promotional offer is accepted by the user.

7. A system for recording vehicle data, the system comprising:
an electronic control unit (ECU) of a vehicle configured to:
detect vehicle data using one or more sensors, and
write vehicle data to a first block of a private blockchain distributed ledger, the vehicle data including a travel routine based on vehicle location data, the private blockchain distributed ledger being stored on a plurality of computing devices, each computing device of the plurality of computing devices acting as a node in a distributed architecture for storing respective copies of the private blockchain distributed ledger and collaboratively maintaining the private blockchain distributed ledger;
selectively write a portion of the vehicle data written on the private blockchain distribution ledger, the portion not including any personally identifiable information, to a first block of a public blockchain distribution ledger; and
a computing device associated with a third party, the computing device configured to:
provide, to the vehicle, a communication based on the travel routine on the public blockchain distributed ledger,
write, to a second block of the public blockchain distributed ledger, a record of providing the communication to the vehicle, and
compare further vehicle location data associated with the communication on a third block of the public blockchain distributed ledger with the travel routine of the first block of the public blockchain distribution ledger to determine a deviation of the vehicle from the travel routine to the further vehicle location based on the communication.

8. The system of claim 7, further comprising:
an output unit of the vehicle configured to provide to a user of the vehicle, the communication; and
an input unit of the vehicle configured to receive from the user of the vehicle, an acceptance or a rejection when the communication is a promotional offer, and
wherein the ECU is further configured to write, to the public blockchain distributed ledger, a record of the acceptance or the rejection.

* * * * *